UNITED STATES PATENT OFFICE.

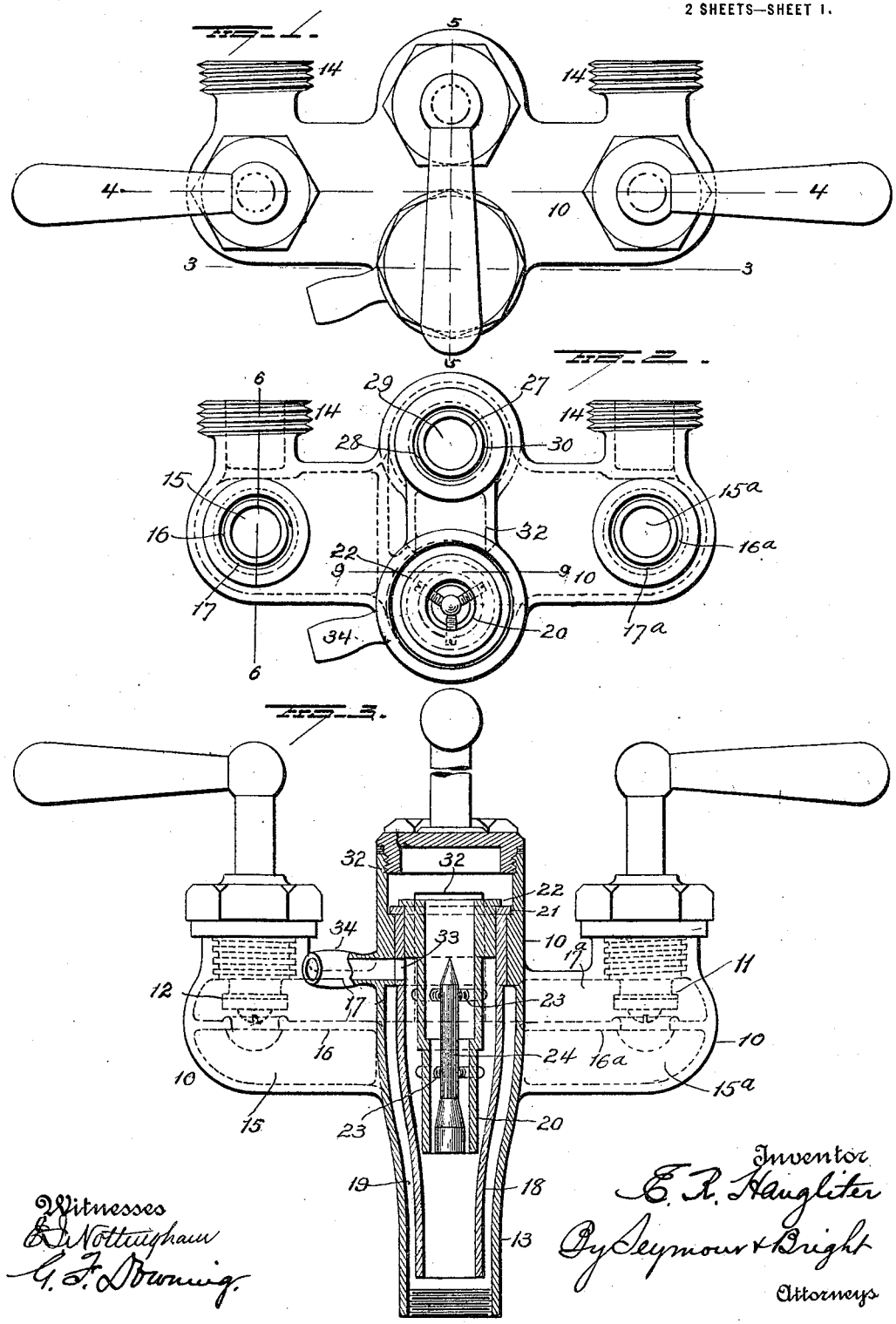

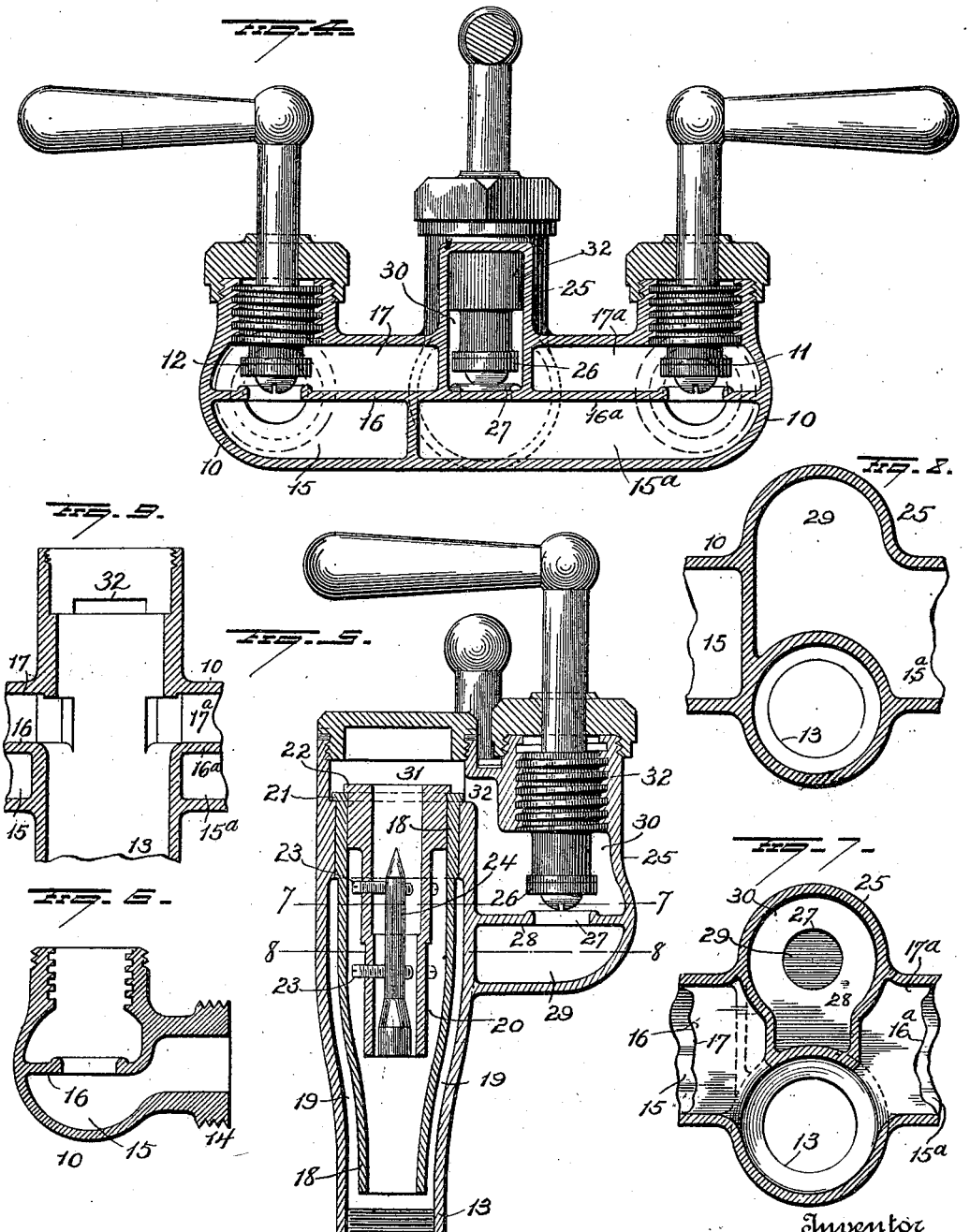

EDWARD R. HANGLITER, OF WASHINGTON, DISTRICT OF COLUMBIA.

BATHTUB-COCK.

1,318,204.   Specification of Letters Patent.   Patented Oct. 7, 1919.

Application filed April 28, 1919. Serial No. 293,074.

*To all whom it may concern:*

Be it known that I, EDWARD R. HANG-LITER, a citizen of the United States, and a resident of Washington, District of Columbia, have invented certain new and useful Improvements in Bathtub-Cocks; and I do hereby declare the following to be a full, clear, and exact description of the invention, such as will enable others skilled in the art to which it appertains to make and use the same.

My invention relates to an improvement in bath tub cocks, the object being to provide a construction whereby a vacuum can be created for massage or other purposes, without the use of any attachment other than the component parts of the device, and it consists in a cock having the usual valve and water discharge spout; a by-pass leading to a nozzle within the spout for creating a vacuum, and an independent valve for controlling the flow of water through the said by-pass to the vacuum nozzle.

It further consists in the parts and combinations of parts as will be more fully explained and pointed out in the claims.

In the accompanying drawings; Figure 1 is a view in plan of my improvement; Fig. 2 is a similar view, the valves being removed; Fig. 3 is a view in vertical section on the line 3—3 of Fig. 1; Fig. 4 is a similar view on the line 4—4 of Fig. 1; Fig. 5 is a view on the line 5—5 of Fig. 1; Fig. 6 is a view on the line 6—6 of Fig. 2; Fig. 7 is a view on the line 7—7 of Fig. 5; Fig. 8 is a view on line 8—8 of Fig. 5, and Fig. 9 is a view on the line 9—9 of Fig. 2.

10 represents an outer casing of a bath tub cock having the usual cold and hot water valves 11 and 12 and the spout 13. This casing is connected by means of the threaded connections 14 with the cold and hot water pipes in the usual and well known manner. The hot water is discharged from the supply pipe into the lower chamber 15 of the casing 10 and its passage to the spout is controlled by the valve 12, the water passing up through the valve opening in the partition 16 into the upper chamber 17 and from thence directly into the spout through the opening shown in Fig. 7, the said spout being in constant communication with said upper chamber 17. Cold water enters through the other pipe connection 14 into the lower chamber 15ᵃ of the outer casing 10 and passes from thence past valve 11 into upper chamber 17ᵃ and through an opening into spout 13, as shown in Fig. 7. Chambers 15 and 15ᵃ are always full of water and the flow to the spout 13 is controlled by the valves 11 and 12 in the usual and well known manner. The parts thus far described do not differ materially from the hot and cold water cocks now in general use.

Located within the casing 10 and projecting into the spout section of the latter is the vacuum tube 18. This tube is smaller than the spout section of the outer casing 10 and the spout portion of the latter, so as to provide a water space 19 around it, and it is this space into which the hot and cold water pass when the valves 12 and 11 are actuated. This vacuum tube 18 terminates above the lower end of the spout 13, its lower end being restricted to about approximately the surface area of the opening in the nozzle 20, so that the hollow stream of water passing from the nozzle will approximately fill the lower end of the tube. This vacuum tube may be secured within the casing 10 in any approved manner but I prefer to provide it, as shown, with a flange 21 resting on a shoulder formed in the upper portion of the casing 10. The nozzle 20 is cylindrical and open throughout its length, and is provided at its upper end with a flange 22 resting on the upper end of the vacuum tube 18. The bore of the nozzle is preferably of two diameters as shown, the lower section being of less diameter than the upper section to provide for increased pressure and speed of flow at the discharge end of the nozzle. It terminates above the lower restricted end of the vacuum tube 18, and as before stated is of such size that the hollow stream of water issuing therefrom is sufficiently large to fill the lower end of the vacuum tube and thus operates to produce a vacuum in the space between nozzle 20 and the tube 18. Secured within the nozzle, by a series of adjusting screws 23 is the plug 24. This plug is centered in the nozzle so as to produce a hollow stream, and is preferably provided with a conical upper end that will not retard in anywise the free flow of water through the nozzle.

The casing 10 is provided with a rearward extension 25 carrying the valve 26 adapted to close the opening 27 in the partition 28, which latter divides the interior of the extension into a lower chamber 29 and an upper chamber 30. The lower chamber 29 is in direct open communication with lower chamber 15ª for the cold water, which may be admitted into the upper compartment 30 by the valve 26, and the upper compartment is in direct communication with the chamber 31 above the nozzle 20 by the by-pass 32, so that after water has been admitted to chamber 30 it is free to pass to and downwardly through nozzle 20.

Opening into the space between the nozzle 20 and the vacuum tube 18, is the port 33 which extends through the nipple 34 preferably cast integral with the outer casing 10. This nipple is designed for attachment of a hose carrying a vacuum or depurator cup or similar massaging apparatus.

With the construction as shown and described the cock can be used in the ordinary manner, all the water from the cold and hot sides passing down the spout in the space between the latter and the vacuum tube. When it is desired to convert it into a massaging apparatus, valve 26 is lifted thus permitting the cold water to pass up into chamber 25 and through by-pass 32 to the top of the nozzle 20 down which it flows and is discharged therefrom in a hollow stream which completely fills the restricted end of the vacuum tube. The downward flow of water through the nozzle and into the vacuum tube produces a vacuum within the latter above the lower end of the nozzle, and as this space is in open communication with the nipple 34 and massaging apparatus attached to the latter, the desired massaging effect will be produced. The operation of the hot and cold water sections of the cock is in no way interfered with and they are operated absolutely independently of the vacuum apparatus and of each other and the operation of the vacuum section of the faucet is the same as that of the ordinary water cock and merely requires the opening of the one valve 26 which causes a flow of water through the by-pass into the nozzle and out at the bottom of the spout where it may be used for bathing and other purposes.

It is clearly evident that instead of connecting the massaging attachment with the cold water side of the cock it may be connected with the hot water side, or with both, or it may be used with a single instead of a multiple cock.

It is evident that other changes may be made in the relative construction and arrangement of parts shown and described without departing from the spirit and scope of my invention, hence I would have it understood that I do not wish to confine myself to the exact construction and arrangement of parts shown and described, but Having fully described my invention what I claim as new and desire to secure by Letters-Patent, is:—

1. As a new article of manufacture, a water cock having a direct and an indirect passage for the water, a vacuum producing nozzle, constituting a part of said indirect passage and a valve for each of said passages.

2. As a new article of manufacture, a water cock having a direct and an indirect passage for the water, a vacuum producing nozzle located within the indirect passage and through which the water passes, and a valve for each of said passages the said valves being independent of each other.

3. As a new article of manufacture, a multiple cock for hot and cold water having a valve for each section of the cock, a by-pass leading from the cold water side of the cock to a vacuum nozzle in the spout of the cock and a separate and independent valve for controlling the water through said by-pass.

4. The combination of an outer casing having a spout and a water chamber, a valve for controlling the flow of water from said chamber to the spout, a vacuum tube located within the spout, a nozzle within said tube, a by-pass leading from the water chamber to the nozzle and a valve for closing said by-pass.

5. The combination of an outer casing having a water chamber, a spout and a connector for a water pipe, a valve for controlling the direct flow of water to the spout, a vacuum tube within the spout, a vacuum nozzle within the tube, a by-pass leading from the water chamber to the nozzle, a valve for controlling the water to said by-pass and a nipple the bore of which communicates with the space between the vacuum tube and nozzle.

6. The combination of an outer casing having a water chamber, a spout and a connector for a water pipe, a valve for controlling the direct flow of water to the spout, a vacuum tube within the spout, a vacuum nozzle within the tube, a centrally located plug in the nozzle, a by-pass leading from the water chamber to the top of the nozzle, a valve for controlling the flow of water through the by-pass, and a hose connection for a massage device the said connection having a bore leading to the space between the tube and the nozzle.

In testimony whereof, I have signed this specification in the presence of two subscribing witnesses.

EDWARD R. HANGLITER.

Witnesses:
A. W. BRIGHT,
GEORGE F. DOWNING.

Copies of this patent may be obtained for five cents each, by addressing the "Commissioner of Patents, Washington, D. C."